(12) United States Patent
Iqbal et al.

(10) Patent No.: US 11,985,133 B1
(45) Date of Patent: May 14, 2024

(54) GATING ACCESS TO DESTINATIONS ON A NETWORK

(71) Applicant: Equinix, Inc., Redwood City, CA (US)

(72) Inventors: Syed Hashim Iqbal, San Jose, CA (US); Muhammad Durrani, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 100 days.

(21) Appl. No.: 17/131,394

(22) Filed: Dec. 22, 2020

Related U.S. Application Data (60) Provisional application No. 63/016,843, filed on Apr. 28, 2020.

(51) Int. Cl.
*H04L 9/40* (2022.01)

(52) U.S. Cl.
CPC ........ H04L 63/102 (2013.01); H04L 63/1408 (2013.01)

(58) Field of Classification Search
CPC ............... H04L 63/102; H04L 63/1408; H04L 29/12594; H04L 63/101; H04L 61/256; H04L 67/02; H04L 45/748
See application file for complete search history.

(56) References Cited

U.S. PATENT DOCUMENTS

| | | | | |
|---|---|---|---|---|
| 7,600,011 | B1 * | 10/2009 | Urbanek | H04L 61/4511 709/226 |
| 7,849,507 | B1 * | 12/2010 | Bloch | H04L 63/168 726/22 |
| 8,566,589 | B1 * | 10/2013 | Satish | G06F 21/577 726/24 |
| 9,178,901 | B2 * | 11/2015 | Xue | H04L 63/1483 |
| 9,276,956 | B2 * | 3/2016 | Geng | G06F 21/55 |
| 9,628,508 | B2 * | 4/2017 | Turbin | H04L 63/1416 |
| 10,341,266 | B2 * | 7/2019 | Sagae | H04L 51/23 |
| 2007/0011168 | A1 * | 1/2007 | Keohane | G06F 16/9566 707/E17.115 |

(Continued)

OTHER PUBLICATIONS

Hao, Shuang, Nick Feamster, and Ramakant Pandrangi. "Monitoring the initial DNS behavior of malicious domains." Proceedings of the 2011 ACM SIGCOMM conference on Internet measurement conference. 2011. (Year: 2011).*

(Continued)

*Primary Examiner* — Theodore C Parsons
*Assistant Examiner* — Sameera Wickramasuriya
(74) *Attorney, Agent, or Firm* — Shumaker & Sieffert, P.A.

(57) ABSTRACT

This disclosure describes techniques that include filtering or gating access to a network based on attributes or an evaluation of the network destination. In one example, this disclosure describes a method that includes receiving, by a computing system and from a client device, a request for information about a network destination; identifying, by the computing system and based on the request, an address associated with the network destination; evaluating, by the computing system, the address to determine whether the address passes a plurality of tests; responsive to determining that the address passes the plurality of tests, storing the address, by the computing system, as one of a plurality of scrutinized addresses; outputting, by the computing system and to the client device, the address.

15 Claims, 6 Drawing Sheets

(56) References Cited

U.S. PATENT DOCUMENTS

| | | | | |
|---|---|---|---|---|
| 2007/0027992 | A1* | 2/2007 | Judge | H04W 24/00 709/227 |
| 2007/0083670 | A1* | 4/2007 | Kelley | H04L 9/3271 713/171 |
| 2008/0016552 | A1* | 1/2008 | Hart | H04L 9/3271 713/171 |
| 2008/0172741 | A1* | 7/2008 | Reumann | G06F 21/64 726/27 |
| 2008/0289047 | A1* | 11/2008 | Benea | G06F 21/64 726/27 |
| 2009/0016335 | A1* | 1/2009 | Bays | H04L 47/115 370/389 |
| 2010/0017865 | A1* | 1/2010 | Leahy | G06F 21/51 709/224 |
| 2010/0186088 | A1* | 7/2010 | Banerjee | G06F 21/51 709/224 |
| 2011/0134761 | A1* | 6/2011 | Smith | H04L 43/0852 370/252 |
| 2012/0023593 | A1* | 1/2012 | Puder | H04L 63/101 726/28 |
| 2012/0158626 | A1* | 6/2012 | Zhu | G06F 21/56 726/22 |
| 2014/0007238 | A1* | 1/2014 | Magee | G06F 21/577 726/24 |
| 2014/0089661 | A1* | 3/2014 | Mahadik | H04L 9/0643 713/162 |
| 2015/0170072 | A1* | 6/2015 | Grant | H04L 63/0263 705/7.36 |
| 2016/0036848 | A1* | 2/2016 | Reddy | H04L 63/0227 726/22 |
| 2017/0346855 | A1* | 11/2017 | Reddy | H04L 63/20 |
| 2018/0020002 | A1* | 1/2018 | Duca | G06F 21/572 |
| 2018/0077120 | A1* | 3/2018 | Baughman | H04L 67/563 |
| 2019/0121943 | A1* | 4/2019 | Wong | H04L 9/0816 |
| 2019/0268423 | A1* | 8/2019 | Shah | H04L 69/22 |
| 2021/0097168 | A1* | 4/2021 | Patel | G06F 21/566 |

OTHER PUBLICATIONS

Clark, Andrew, Kun Sun, and Radha Poovendran. "Effectiveness of IP address randomization in decoy-based moving target defense." 52nd IEEE Conference on Decision and Control. IEEE, 2013. (Year: 2013).*

L. Wu, X. Du and J. Wu, "Effective Defense Schemes for Phishing Attacks on Mobile Computing Platforms," in IEEE Transactions on Vehicular Technology, vol. 65, No. 8, pp. 6678-6691, Aug. 2016, doi: 10.1109/TVT.2015.2472993. (Year: 2016).*

"Firepower Management Center Configuration Guide," CISCO, Chapter: URL Filtering, Version 6.3, Retrieved Mar. 22, 2021 from: https://web.archive.org/web/20210116113159/https://www.cisco.com/c/en/us/td/docs/security/firepower/630/configuration/guide/fpmc-config-guide-v63/url_filtering.html, Updated Sep. 22, 2020, 14 pp.

"How do DNS clients choose an IP address when they get multiple answers?," serverfault, Retrieved from: https://serverfault.com/questions/102879/how-do-dns-clients-choose-an-ip-address-when-they-get-multiple-answers#:~:text=A%20client%20program%20picking%20an,the%20second%20and%20so%20on, Accessed Apr. 5, 2021, 1 pp.

"What is the purpose of a DNS server returning more than 1 A record?," serverfault, Retrieved from: https://serverfault.com/questions/264799/what-is-the-purpose-of-a-dns-server-returning-more-than-1-a-record#:~:text=The%20DNS%20server%20returns%20all,resolve%20which%20IP%20to%20use.&text=If%20a%20client%20fails%20to,one%20IP%20address%20is%20provided, Accessed Apr. 5, 2021, 1 pp.

Mockapetris, "Domain Names—Implementation and Specification," Network Working Group: RFC 1035, Nov. 1987, 55 pp.

* cited by examiner

GATING ACCESS TO DESTINATIONS ON A NETWORK

CROSS REFERENCE

This application claims the benefit of U.S. Provisional Patent Application No. 63/016,843 filed on Apr. 28, 2020, which is hereby incorporated by reference herein in its entirety.

TECHNICAL FIELD

This disclosure relates to computer networks, and more specifically, to enabling or disabling access to network destinations.

BACKGROUND

Organizations sometimes exercise some control over users' ability to access content on a network. There may be a number of reasons for doing so, including to avoid the download and spread of malware or active content that may represent a security risk. Access to other network destinations that might not represent a security risk is sometimes also blocked. Such network destinations may include social media or video streaming websites, which might affect productivity or network bandwidth. Access to other network destinations might also be blocked to prevent access to content that might be considered objectionable, or that might violate compliance regulations.

SUMMARY

This disclosure describes techniques that include filtering or gating access to a network based on an evaluation of attributes of the network destination. Such techniques may involve evaluating or scrutinizing addresses of network destinations by evaluating the addresses based on one or more criteria. Such criteria may include indicia of address legitimacy, information about the latency of the network device associated with the address, information about the geographical location of the network device associated with the address, and other criteria.

In some examples, filtering or gating access to a network can be performed using a computing system that serves as a domain name system (DNS) and a security gate. In such an example, a DNS system as described herein identifies addresses in response to requests to resolve a domain name. Before returning addresses in response to DNS requests, the DNS system tests or evaluates the identified address(es) for a number of criteria, which may include legitimacy, latency, location, and/or other criteria. Those addresses that pass the tests are returned in response to the DNS request. In some examples, if no address passes the tests, no address is returned in response to the DNS request.

Also in such an example, a security gate may monitor traffic to a network and scrutinize the destination addresses of devices sought to be accessed on the network. To scrutinize the destination addresses, security gate may determine whether the destination address has been evaluated for one or more criteria. Proposed network traffic associated with destination addresses that have been evaluated and have passed one or more tests may be permitted to access the network. Proposed network traffic associated with destination addresses that have not been evaluated or have not passed the tests may be blocked from accessing the network.

The techniques described herein may provide certain technical advantages. For instance, by evaluating network addresses for legitimacy, latency, and location, addresses can be better evaluated to identify network destinations that may be a threat, a security risk, malicious, or otherwise inappropriate. Further, to the extent that evaluations can be performed automatically, manually maintaining a whitelist of addresses might not be needed. Still further, by using gating access to the network by scrutinizing destination addresses for those that have passed some or all of the evaluations associated with network addresses, attempts to bypass the protections of the system might be prevented.

In some examples, this disclosure describes operations performed by a computing system in accordance with one or more aspects of this disclosure. In one specific example, this disclosure describes a method comprising receiving, by a computing system and from a client device, a request for information about a network destination; identifying, by the computing system and based on the request, an address associated with the network destination; evaluating, by the computing system, the address to determine whether the address passes a plurality of tests; responsive to determining that the address passes the plurality of tests, storing the address, by the computing system, as one of a plurality of scrutinized addresses; and outputting, by the computing system and to the client device, the address.

In another example, this disclosure describes a computing system having a storage system and processing circuitry, wherein the processing circuitry has access to the storage system and is configured to perform operations comprising: receiving, from a client device, a request for information about a network destination; identifying, based on the request, an address associated with the network destination; evaluating the address to determine whether the address passes a plurality of tests; responsive to determining that the address passes the plurality of tests, storing the address as one of a plurality of scrutinized addresses; and outputting, to the client device, the address.

DETAILED DESCRIPTION

Figure 1A:
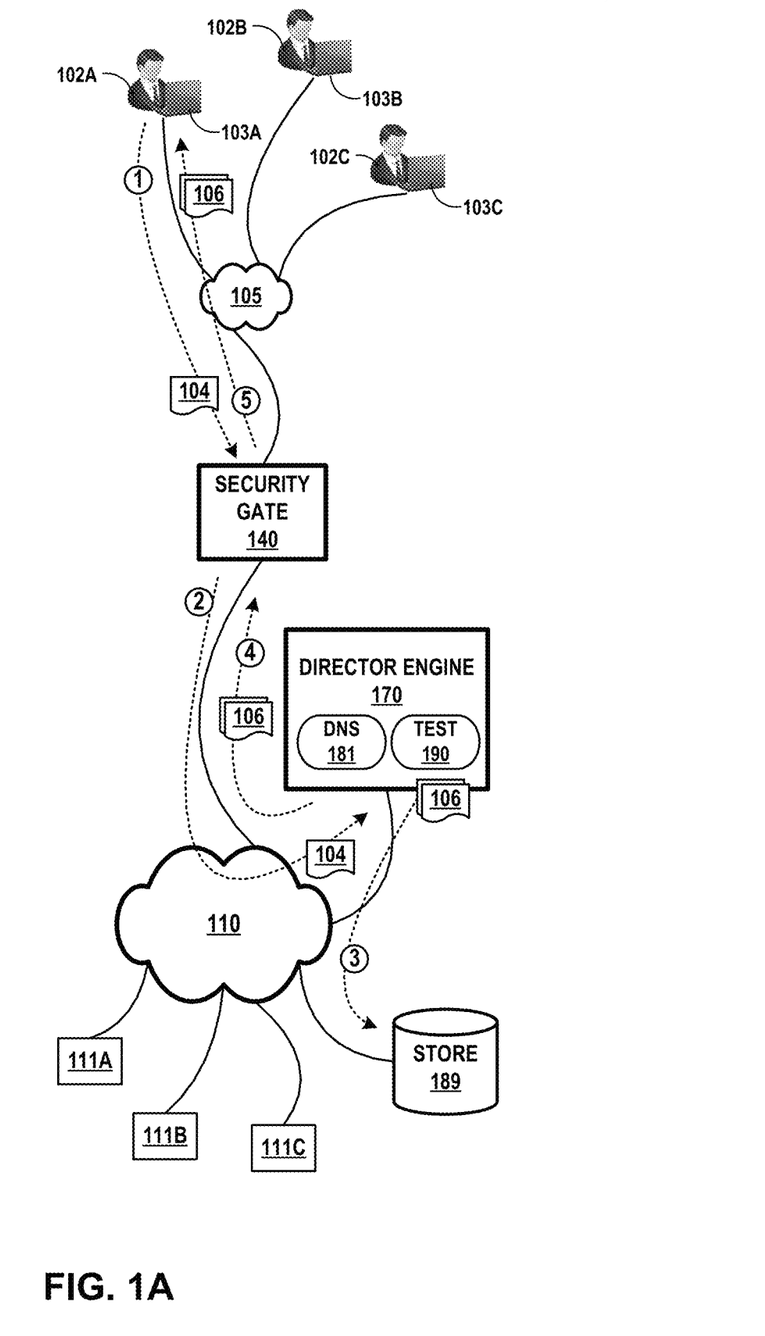
FIG. 1A and FIG. 1B are conceptual diagrams illustrating an example system in which client devices are prevented from accessing destinations or devices that may be potentially harmful or malicious or may pose a security threat, in accordance with one or more aspects of the present disclosure.
Figure 1B:
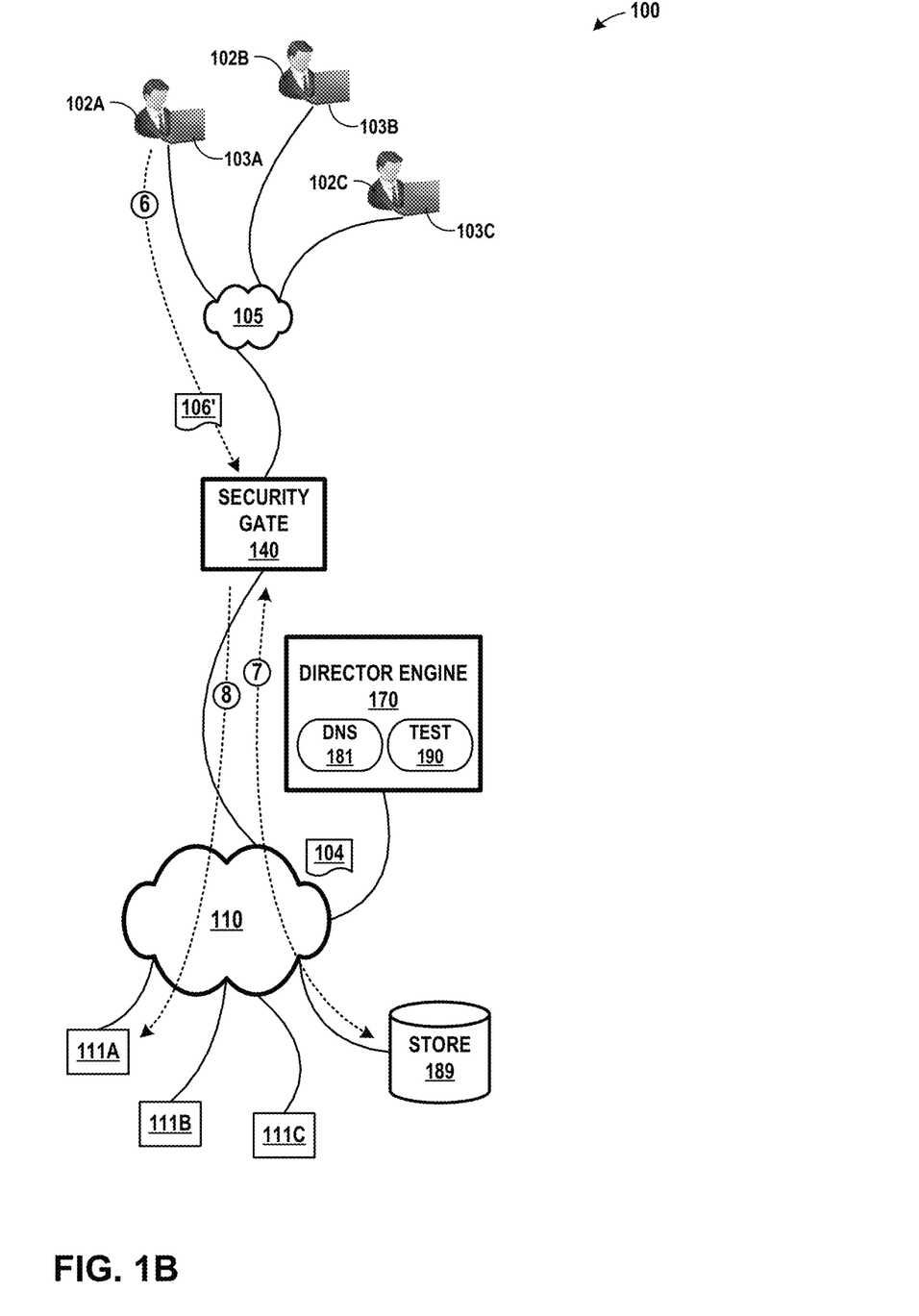

FIG. 1A and FIG. 1B are conceptual diagrams illustrating an example system in which client devices are prevented from accessing destinations or devices that may be potentially harmful or malicious or may pose a security threat, in accordance with one or more aspects of the present disclosure. Both FIG. 1A and FIG. 1B illustrate system 100, which may include any number of client devices 103 (corresponding to individually illustrated client devices 103A through 103C), each operated by a corresponding one of users 102 (individually illustrated as users 102A through 102C, respectively). Each of client devices 103 are connected to network 105. Network 105 is connected to public network 110 through security gate 140. Security gate 140 may selectively gate access to public network 110 for devices connected to network 105 (e.g., client devices 103). In other words, network 105 and public network 110 may be arranged so that any traffic originating from network 105 accesses public network 110 through gate 140. In some examples, security gate 140 serves as or is part of a gateway router, such as might connect to an internet service provider.

Network 105 may be a private network, configured to provide services to a subset of devices (e.g., client devices 103). Public network 110 may be a public network, such as the internet. Connected to public network 110 are any number of websites 111 (individually illustrated as websites 111A through 111C).

Also connected to public network 110 is security gate 140, director engine 170, and data store 189. Director engine 170 includes DNS module 181 and test module 190. DNS module 181 of director engine 170 implements functions corresponding to a domain name system (DNS), and thus, director engine 170 may serve as a DNS server for one or more of client devices 103.

Data store 189 may serve as a repository for information about addresses evaluated by test module 190. In some examples, data store 189 includes a whitelist of addresses that have been passed tests conducted by test module 190.

FIG. 1A is an example conceptual diagram illustrating an example client device 103 performing a DNS lookup using director engine 170. FIG. 1B illustrates operations after client device 103A receives addresses 106 in response to a DNS request, e.g. a DNS reply in response to a DNS query, where addresses 106 are identified by DNS module 181 of director engine 170. FIG. 1B illustrates client device 103A accessing a network destination through security gate 140, in accordance with one or more aspects of the present disclosure.

FIG. 1A and FIG. 1B illustrate an example system in which security gate 140 and director engine 170 operate together to prevent client devices 103 from accessing destinations or devices on public network 110 that may potentially be harmful, malicious, or may pose a security risk. Security gate 140 and director engine 170 may alternatively, or in addition, operate to prevent access, by client devices 103, to websites that may provide objectionable, irrelevant, or non-work related content. Security gate 140 may, in some examples, gate all access to public network 110 by devices on network 105. Security gate 140 may determine whether to enable access to a request originating from a device on network 105 by evaluating the network address of the desired destination on public network 110. Such evaluation is described herein as typically being performed by director engine 170. If the network address passes the scrutiny of such evaluation, security gate 140 enables access to public network 110. In the example of FIG. 1A, director engine 170 and data store 189 are shown as part of public network 110, although in other examples one or more of such devices or systems may be part of another network, such as network 105.

In FIG. 1A, and in accordance with one or more aspects of the present disclosure, client device 103A may initiate a request for information from website 111A by causing director engine 170 to perform a DNS lookup. For instance, in an example that can be described with reference to FIG. 1A, client device 103A detects input that it determines corresponds to a request for information from a network destination, identified by URL 104. Client device 103A outputs URL 104 over network 105 (see network traffic labeled "1"). Security gate 140 detects a signal over network 105 and determines that the signal includes URL 104, destined for director engine 170. As further described herein, security gate 140 may perform a gating function that involves scrutinizing the address of director engine 170 (e.g., the destination DNS server). Security gate 140 enables access to public network 110, and URL 104 travels over public network 110 to director engine 170 (see network traffic labeled "2"). DNS module 181 of director engine 170 identifies an address associated with URL 104 by performing a DNS lookup to translate URL 104 into one or more addresses 106 (e.g., IP addresses).

Director engine 170 may evaluate addresses 106 identified as a result of the DNS lookup. For instance, continuing with the example being described in FIG. 1A, director engine 170 causes test module 190 to perform various tests on each of addresses 106. In one example, test module 190 evaluates each of addresses 106 for legitimacy, latency, and location. Such tests may be used to evaluate whether the IP address is associated with a website or network destination that has content that is objectionable, potentially, harmful, irrelevant, and/or not appropriate (e.g., not work-related).

Director engine 170 may store one or more of addresses 106. For instance, still referring to the example being described with reference to FIG. 1A, test module 190 determines that some or all of addresses 106 passed the scrutiny of test module 190. Test module 190 causes director engine 170 to output a signal over network 110 (see network traffic labeled "3"). Data store 189 detects a signal over network 110 and determines that the signal corresponds to one or more addresses 106 (e.g., those addresses 106 that have passed scrutiny). Data store 189 stores addresses 106.

Director engine 170 may respond to the DNS lookup initiated by client device 103A with one or more of addresses 106. For example, if test module 190 determines that some or all of addresses 106 pass the tests performed by test module 190, DNS module 181 causes director engine 170 to output, over network 110, addresses 106 (see network traffic labeled "4"). Security gate 140 enables the network traffic to flow through to network 105. Client device 103A detects a signal over network 105 and determines that the signal corresponds to a response to the DNS lookup (see network traffic labeled "5") previously initiated by client device 103A. Where addresses 106 include more than one address, client device 103A may determine that the information from director engine 170 identifies address 106' (associated with website 111A) as a preferred address among addresses 106.

In FIG. 1B, and in accordance with one or more aspects of the present disclosure, client device 103A may use one of the addresses identified by DNS module 181 to initiate access to a network destination on public network 110. For instance, in an example that can be described with reference to FIG. 1B, client device 103A outputs a signal over network 105 (see network traffic labeled "6"). In the example of FIG. 1B, the request identifies address 106' as the address of the desired network destination on public network 110 (corresponding to website 111A).

Security gate 140 may perform a gating function to determine whether to enable client device 103A to access website 111A. For instance, continuing with the example being described with reference to FIG. 1B, security gate 140 detects a signal over network 105. Security gate 140 determines that the signal corresponds to a request by client device 103A to access website 111A at address 106'. Before allowing the network activity to proceed to its destination on public network 110, security gate 140 evaluates address 106'.

To perform such an evaluation, security gate 140 may access data store 189 (e.g., over public network 110) and determine whether address 106' is included within a whitelist of addresses that have passed the evaluation or scrutiny performed by test module 190 (see network traffic labeled "7"). In some examples, security gate 140 may consult local (e.g., cached) information, rather than accessing data store 189 over public network 110. In such an example, security gate 140 may consult a locally-stored access list (or whitelist) of addresses that have passed the evaluations performed by test module 190. Security gate 140 may, in other examples, determine whether address 106' corresponds to a static route to public network 110, where security gate 140 maintains a static route for addresses that have passed the evaluations performed by test module 190. If security gate 140 determines that address 106' is included in the list of addresses that have passed evaluations performed by test module 190 (or that a static route exists for address 106'), security gate 140 enables the network activity to pass through security gate 140 and to website 111A (see the network traffic labeled "8"). If security gate 140 determines that address 106' is not included on such a list, security gate 140 rejects the traffic, denying client device 103A access to website 111A.

The techniques described herein may provide certain technical advantages. For instance, by evaluating network addresses for legitimacy, latency, and location, addresses can be better evaluated to identify network destinations that may be a threat, a security risk, malicious, or otherwise inappropriate is possible. Further, to the extent that evaluations can be performed automatically, manually maintaining a whitelist of addresses might not be needed, and similarly, the need to query a whitelist for each URL may also be reduced or eliminated. For example, operations performed by security gate 140 and/or director engine 170 (e.g., filtering and evaluation) may be performed outside of client devices 103 and outside of network 105, and provided as a scalable and agile service. Little or no service degradation is caused by the operations performed by security gate 140 and/or director engine 170, at least because such operations are performed outside the service platform. For instance, in some examples, director engine 170 may serve multiple networks 105, each of which may be a separate entity or data center customer. In such an example, each of such entities may each have a separate security gate 140, each gating access from a respective network 105 to a public network (e.g., the internet). A hosting services provider may therefore provide network intelligence and/or network destination scrutiny services, through director engine 170, to each of a number of entities or customers that each operate a separate network 105. Each of customer networks 105 may leverage the services provided by director engine 170, and may do so with little or no service degradation, at least because evaluating an address at each respective security gate 140 is likely to be a low latency operation, particularly if a whitelist of addresses is are cached within each of the customers' security gates 140. Some operations described herein as being performed by directory engine 170 may higher latency, but director engine 170 might be able to reduce the effective latency for any given customer by scaling such operations across many entities. In addition, director engine 170 may also reduce the latency such operations may require by being optimized to perform such operations efficiently.

Further, by gating access to the network through scrutinizing destination addresses for those that have passed some or all of the evaluations associated with network addresses, attempts to bypass the protections of the system can be prevented. In some examples, system 100 may also enable proactive detection of malicious attempts to spoof addresses/domain names and/or gain access to computing resources.

Figure 2:
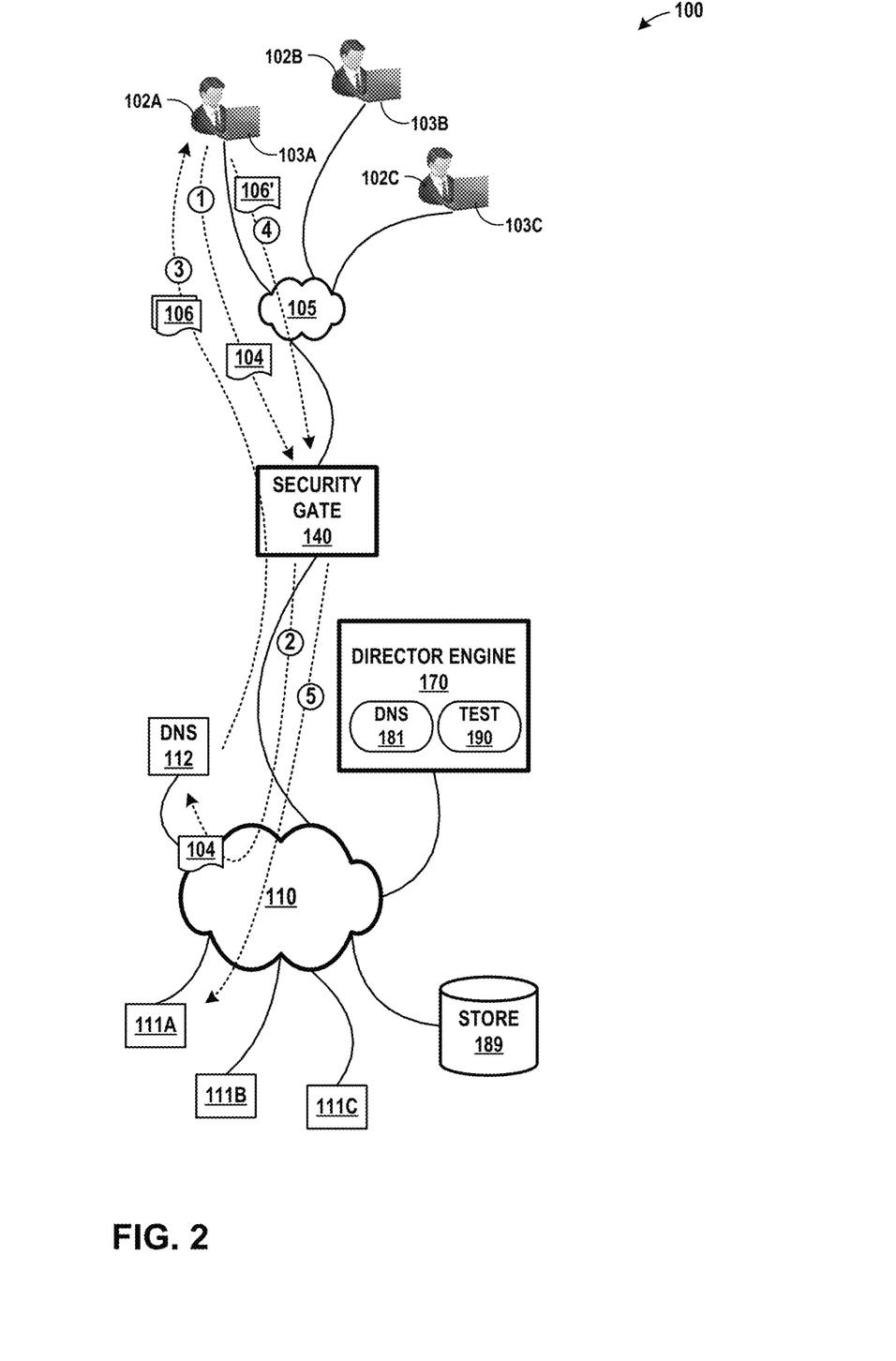
FIG. 2 is a conceptual diagram illustrating an example client device seeking to bypass a director engine by using a different DNS server, in accordance with one or more aspects of the present disclosure.

FIG. 2 is a conceptual diagram illustrating an example client device seeking to bypass director engine 170 by using a different DNS server, in accordance with one or more aspects of the present disclosure. FIG. 2 illustrates system 100 and many of the same devices and systems illustrated in FIG. 1A and FIG. 1B. Accordingly, each system or device illustrated in FIG. 2 may correspond to the like-numbered system or device illustrated and described in connection with FIG. 1A and FIG. 1B.

FIG. 2 also includes DNS server 112 attached to public network 110. In some examples, DNS server 112 may be a conventional public DNS server device that receives requests to resolve URLs to addresses, and returns addresses in response to such requests.

In FIG. 2, and in accordance with one or more aspects of the present disclosure, system 100 may be capable of blocking access to objectionable addresses, even if user 102A attempts to avoid director engine 170 by configuring client device 103A to access a different DNS server. For instance, in an example that can be described with reference to FIG. 2, client device 103A detects input (e.g., from user 102A) that client device 103A determines corresponds to an address for DNS server 112. Client device 103A configures its network settings, in response to the input, to use DNS server 112 for DNS requests, where DNS server 112 is a legitimate DNS server. Client device 103A thereafter detects input that corresponds to a request to access URL 104. Client device 103A outputs a signal over network 105 to obtain an address for URL 104 (see network traffic labeled "1"). Since DNS server 112 is a legitimate DNS sever, security gate 140 allows access to DNS server 112 (see network traffic labeled "2"). DNS server 112 responds to client device 103A with one or more addresses 106 that correspond to URL 104 (see network traffic labeled "3"). Client device 103A initiates access to one of addresses 106 (e.g., address 106') by sending a request over network 105 (see network traffic labeled "4"). Security gate 140 intercepts the request. Before allowing access to public network 110, security gate 140 accesses data store 189 to determine whether address 106' is a permitted network destination. If address 106' is included on a whitelist of permitted addresses at data store 189, security gate 140 permits access to website 111A (see network traffic labeled "5"). If, however, address 106' is not determined to be a permitted network destination, security gate 140 denies access to network 110 and website 111A.

In the example just described, client device 103A is configured to avoid accessing director engine 170, but security gate 140 still operates to block access to addresses that have not passed tests performed by test module 190. Accordingly, in the example of FIG. 2, client device 103A is unable to bypass the protections provided security gate 140 and director engine 170 by simply using DNS server 112 as a DNS server instead of director engine 170.

Figure 3:
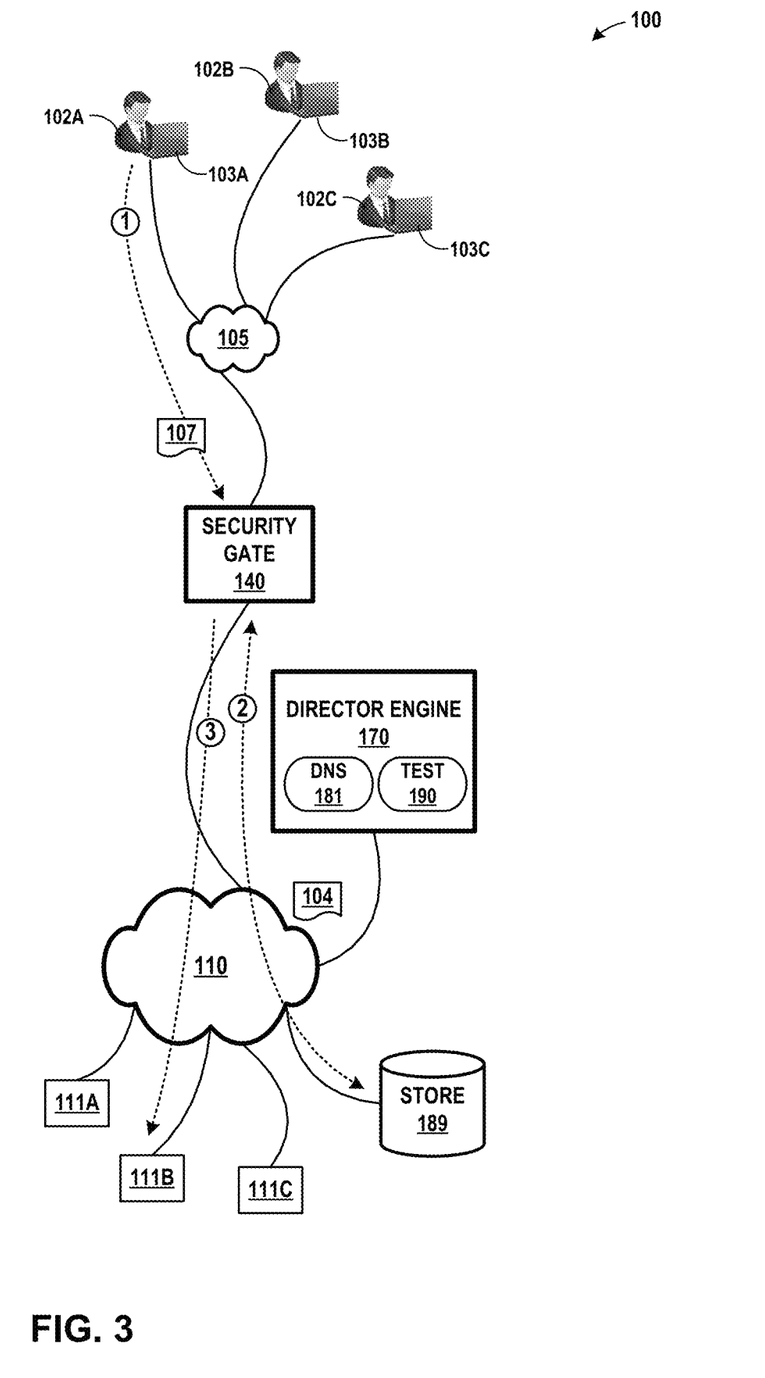
FIG. 3 is a conceptual diagram illustrating an example client device seeking to bypass a director engine by accessing a network destination directly using an address, rather than resolving a name to an address, in accordance with one or more aspects of the present disclosure.

FIG. 3 is a conceptual diagram illustrating an example client device seeking to bypass director engine 170 by accessing a network destination directly using an address, rather than resolving a name to an address, in accordance with one or more aspects of the present disclosure. FIG. 3, like FIG. 2, also illustrates system 100 and many of the same devices and systems illustrated in FIG. 1A and FIG. 1B. Accordingly, each system or device illustrated in FIG. 3 may correspond to like-numbered systems or devices illustrated and described in connection with FIG. 1A and FIG. 1B.

In accordance with one or more aspects of the present disclosure, system 100 may be capable of blocking access to objectionable addresses, even if user 102A attempts to directly access a device on public network 110 by using the address of website 111A, without first resolving a URL into the address. For instance, in an example that can be described with reference to FIG. 3, client device 103A detects input that it determines corresponds to a request to access a network resource on public network 110 (e.g., website 111B). Client device 103A further determines that the input includes address 107, which is the IP address of website 111B. Since client device 103A already has address 107, there is likely no need in this example to access a DNS server to identify the address of website 111B. Accordingly, client device 103A outputs a request over network 105, destined for website 111B (see network traffic labeled "1"). Security gate 140 detects the request, and determines whether address 107 is included within the store of addresses at data store 189. To make such a determination, security gate 140 communicates with data store 189 over public network 110 (see network traffic labeled "2"). If address 107 is included on a whitelist of permitted addresses at data store 189, security gate 140 permits access to website 111B using address 107 (see network traffic labeled "3"). If, however, address 107 is not determined to be a permitted network destination (e.g., not on the whitelist), security gate 140 denies access to website 111B.

In the example just described, client device 103A attempts to access website 111B on public network 110 directly, using address 107, which is the IP address of website 111B. If address 107 had been scrutinized previously, then security gate 140 may enable access to website 111B. However, security gate 140 blocks the request if the address has not been previously scrutinized by test module 190 of director engine 170. Accordingly, in the example of FIG. 3, client device 103A is unable to bypass the filtering and/or protections provided by security gate 140 and director engine 170 by attempting to use the IP address to directly access the desired network resource.

Figure 4:
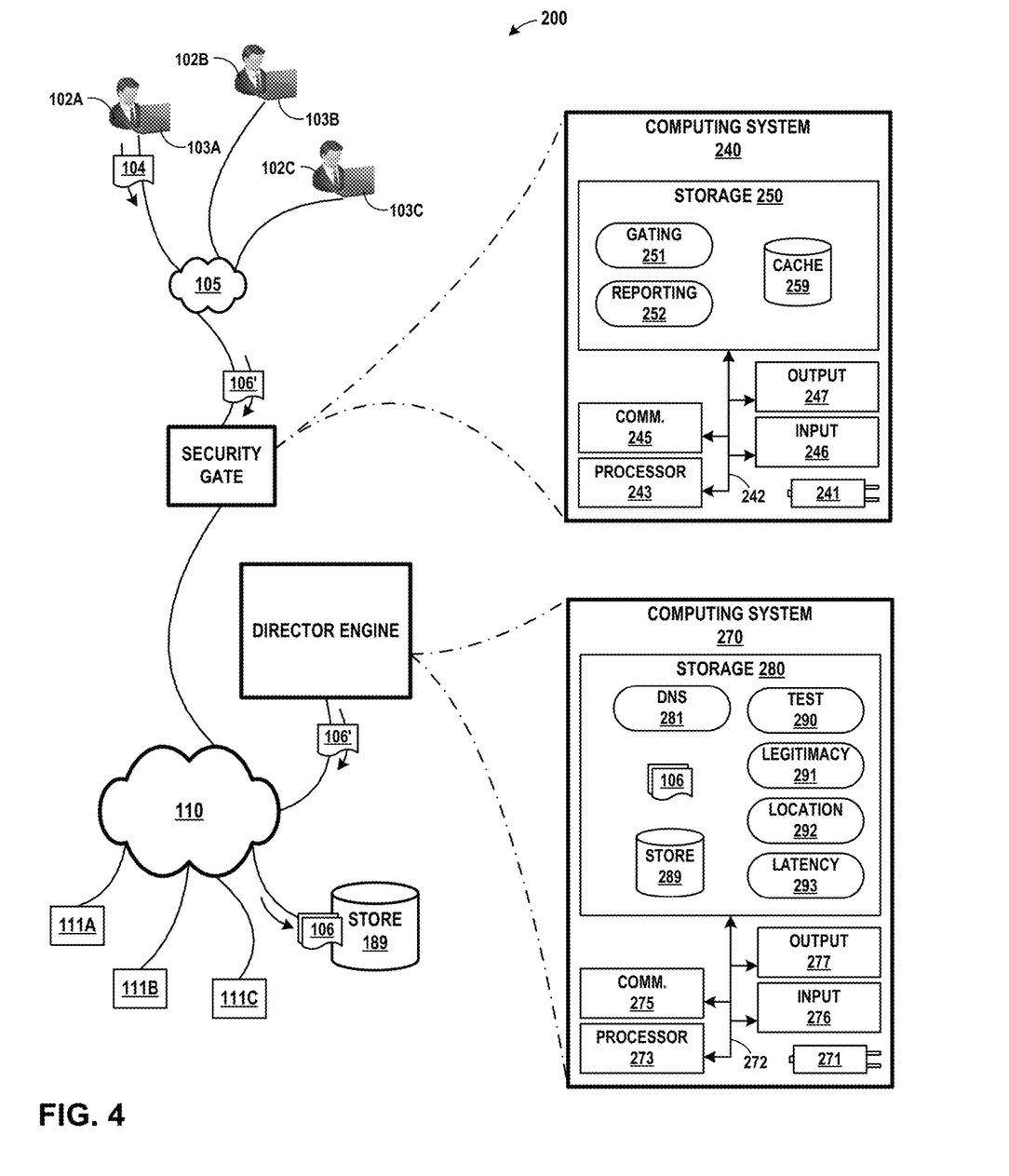
FIG. 4 is a block diagram illustrating an example system for filtering or gating access to a network, in accordance with one or more aspects of the present disclosure.

FIG. 4 is a block diagram illustrating an example system for filtering or gating access to a network, in accordance with one or more aspects of the present disclosure. System 200 of FIG. 4 may be described as an example or alternative implementation of system 100 of FIG. 1A and FIG. 1B. The example of FIG. 4 includes many of the same devices and systems illustrated in earlier figures, and each system or device illustrated in FIG. 2 may correspond to the like-numbered system or device described elsewhere herein. However, system 200 of FIG. 4 includes computing system 270 and computing system 240. Computing system 270 may correspond to director engine 170 of FIG. 1A and FIG. 1B, and computing system 240 may correspond to security gate 140 of FIG. 1A and FIG. 1B.

Computing system 270 may serve as a director engine, and may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 270 may be a distributed system, and/or may represent a cloud computing system, server farm, and/or server cluster (or portion thereof) that provides services to client devices and other devices or systems. In other examples, computing system 270 may represent or be implemented through one or more virtualized compute instances (e.g., virtual machines, containers) of a data center, cloud computing system, server farm, and/or server cluster.

In the example of FIG. 4, computing system 270 may include power source 271, one or more processors 273, one or more communication units 275, one or more input devices 276, one or more output devices 277, and one or more storage devices 280. Storage devices 280 may include DNS module 281, test module 290, legitimacy module 291, location module 292, latency module 293, and data store 289. Addresses 106 may be generated or produced as a result of a query performed by DNS module 281 on data store 289 or another data store. One or more of the devices, modules, storage areas, or other components of computing system 270 may be interconnected to enable inter-component communications (physically, communicatively, and/or operatively). In some examples, such connectivity may be provided by through communication channels (e.g., communication channels 272), a system bus, a network connection, an inter-process communication data structure, or any other method for communicating data.

Power source 271 may provide power to one or more components of computing system 270. Power source 271 may receive power from the primary alternating current (AC) power supply in a datacenter, building, home, or other location. In other examples, power source 271 may be a battery or a device that supplies direct current (DC). In still further examples, computing system 270 and/or power source 271 may receive power from another source. One or more of the devices or components illustrated within computing system 270 may be connected to power source 271, and/or may receive power from power source 271. Power source 271 may have intelligent power management or consumption capabilities, and such features may be controlled, accessed, or adjusted by one or more modules of computing system 270 and/or by one or more processors 213 to intelligently consume, allocate, supply, or otherwise manage power.

One or more processors 273 of computing system 270 may implement functionality and/or execute instructions associated with computing system 270 or associated with one or more modules illustrated herein and/or described below. One or more processors 273 may be, may be part of, and/or may include processing circuitry that performs operations in accordance with one or more aspects of the present disclosure. Examples of processors 273 include microprocessors, application processors, display controllers, auxiliary processors, one or more sensor hubs, and any other hardware configured to function as a processor, a processing unit, or a processing device. Central monitoring system 210 may use one or more processors 273 to perform operations in accordance with one or more aspects of the present disclosure using software, hardware, firmware, or a mixture of hardware, software, and firmware residing in and/or executing at computing system 270.

One or more communication units 275 of computing system 270 may communicate with devices external to computing system 270 by transmitting and/or receiving data, and may operate, in some respects, as both an input device and an output device. In some examples, communication unit 275 may communicate with other devices over a network. In other examples, communication units 275 may send and/or receive radio signals on a radio network such as a cellular radio network. In other examples, communication units 275 of computing system 270 may transmit and/or receive satellite signals on a satellite network such as a Global Positioning System (GPS) network. Examples of communication units 275 include a network interface card (e.g. such as an Ethernet card), an optical transceiver, a radio frequency transceiver, a GPS receiver, or any other type of device that can send and/or receive information. Other examples of communication units 275 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 276 may represent any input devices of computing system 270 not otherwise separately described herein. One or more input devices 276 may generate, receive, and/or process input from any type of device capable of detecting input from a human or machine. For example, one or more input devices 276 may generate, receive, and/or process input in the form of electrical, physical, audio, image, and/or visual input (e.g., peripheral device, keyboard, microphone, camera).

One or more output devices 277 may represent any output devices of computing system 270 not otherwise separately described herein. One or more output devices 277 may generate, receive, and/or process output from any type of device capable of outputting information to a human or machine. For example, one or more output devices 277 may generate, receive, and/or process output in the form of electrical and/or physical output (e.g., peripheral device, actuator).

One or more storage devices 280 within computing system 270 may store information for processing during operation of computing system 270. Storage devices 280 may store program instructions and/or data associated with one or more of the modules described in accordance with one or more aspects of this disclosure. One or more processors 273 and one or more storage devices 280 may provide an operating environment or platform for such modules, which may be implemented as software, but may in some examples include any combination of hardware, firmware, and software. One or more processors 273 may execute instructions and one or more storage devices 280 may store instructions and/or data of one or more modules. The combination of processors 273 and storage devices 280 may retrieve, store, and/or execute the instructions and/or data of one or more applications, modules, or software. Processors 273 and/or storage devices 280 may also be operably coupled to one or more other software and/or hardware components, including, but not limited to, one or more of the components of computing system 270 and/or one or more devices or systems illustrated as being connected to computing system 270.

In some examples, one or more storage devices 280 are temporary memories, which may mean that a primary purpose of the one or more storage devices is not long-term storage. Storage devices 280 of computing system 270 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 280, in some examples, also include one or more computer-readable storage media. Storage devices 280 may be configured to store larger amounts of information than volatile memory. Storage devices 280 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

DNS module 281 may perform functions relating to providing the services of a domain name system (DNS), which may include resolving URLs into IP addresses. DNS module 281 may receive a URL or other information and perform a DNS lookup to identify one or more addresses that correspond to the URL. DNS module 281 may access data store 289 when performing a DNS lookup. Alternatively, or in addition, DNS module 281 may initiate communication to one or more systems outside of computing system 270 to perform the DNS lookup. DNS module 281 may communicate information about the results of lookup operations to test module 290.

Test module 290 may perform functions relating to conducting, coordinating, and/or evaluating the results of tests performed by other modules, including legitimacy module 291, location module 292, and latency module 293. Test module 290 may implement configurable or multiple levels of security or scrutiny. In such an example, computing system 270 may provide security services (e.g., network access gating, as described herein) to multiple organizations or end users having differing needs. Test module 290 may output information about an address to legitimacy module 291, location module 292, and/or latency module 293 and in response, receive the results of such tests. Test module 290 may evaluate the results and communicate to DNS module 281 one or more addresses 106 that successfully passed some or all of the tests performed by legitimacy module 291, location module 292, and latency module 293. Test module 290 may store information about addresses 106 within data store 289 and may query data store 289 for information about one or more URLs and/or addresses. Test module 290 may also cause communication unit 275 to communicate with data store 189 to store one or more of addresses 106 or to query data store 189 for information about addresses previously evaluated.

Legitimacy module 291 may perform tests to evaluate for issues pertaining to legitimacy. In general, legitimacy module 291 may evaluate an address addresses to determine whether the address is legitimate, rather than an invalid or spoofed address that may represent a security risk or other threat. Legitimacy module 291 may check route registries of subnets associated with one or more of addresses 106. Legitimacy module 291 may determine whether a route object associated with one or more of addresses 106 exists. Legitimacy module 291 may determine whether the host associated with each of addresses 106 is behind a legitimate content delivery network. Legitimacy module 291 may also perform a WHOIS lookup one of addresses 106, and if that lookup does not correspond to the original URL or domain, legitimacy module 291 may deem the address to be not legitimate. Legitimacy module 291 may receive one or more addresses from test module 290, and may output results of tests performed by legitimacy module 291 to test module 290.

Location module 292 may perform tests to evaluate addresses for issues pertaining to latency. In general, location module 292 may evaluate historical response times or other indicia of responsiveness. Location module 292 may collect latency information about historical traffic to an address and log the information for later use in evaluating latency. For instance, legitimacy module 291 may check the latency associated with an address against a threshold to determine whether the address passes a latency test. In some examples, such a threshold may be set to a value on the order of 50 milliseconds. Location module 292 may also perform live tests pertaining to latency by, for example, initiating a ping test with a device at the address, or by initiating a different type of test. Location module 292 may receive one or more addresses from test module 290, and may output results of tests performed by location module 292 to test module 290.

Latency module 293 may perform tests to evaluate addresses for issues pertaining to location. In general, latency module 293 may evaluate the location associated with an IP address. For instance, latency module 293 may determine that the location associated with an address is in a jurisdiction or country known to be the source of security threats or disinformation campaigns. Latency module 293 may determine, based on such information suggesting that an address might be a security or other threat, that the location-based tests conducted by latency module 293 are not satisfied by one or more addresses. Further, latency module 293 may determine that the location associated with an address is inconsistent with other information known about the network destination. For instance, latency module 293 may determine whether each of addresses 106 corresponds to regional traffic, and if so, may determine whether any of addresses 106 trespass outside of the region. Latency module 293 may receive one or more addresses from test module 290, and may output results of tests performed by latency module 293 to test module 290.

Data store 289 may represent any suitable data structure or storage medium for storing address information. In some examples, data store 289 may also store information enabling DNS module 281 to perform DNS services, such as resolving URL 104 into one or more addresses 106. Alternatively, or in addition, data store 289 may store information about the results of tests performed by legitimacy module 291, location module 292, and latency module 293. In such an example, data store 289 may include a whitelist of addresses, or information relating to legitimacy, location, and/or latency of such addresses. Data store 289 may store information about addresses that have been evaluated, and may further include information indicating, for each such address, whether the addresses passed one or more of the tests performed by legitimacy module 291, location module 292, and latency module 293. Data store 289 may serve as a primary store for such information supplementing or replacing data store 189. In other examples, data store 289 may serve as a cache for information about the results of tests applied to addresses 106. The information stored in data store 289 may be searchable and/or categorized such that one or more modules within computing system 270 may provide an input requesting information from data store 289, and in response to the input, receive information stored within data store 289. Data store 289 may be primarily maintained by either DNS module 281 or test module 290.

Computing system 240 may serve as a gate (e.g., a security gate), and may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 may be a distributed system, and/or may represent a cloud computing system, server farm, and/or server cluster (or portion thereof) that provides services to client devices and other devices or systems. In other examples, computing system 240 may represent or be implemented through one or more virtualized compute instances (e.g., virtual machines, containers) of a data center, cloud computing system, server farm, and/or server cluster.

In the example of FIG. 4, computing system 240 may include power source 241, one or more processors 243, one or more communication units 245, one or more input devices 246, one or more output devices 247, and one or more storage devices 250. Storage devices 250 may include gating module 251, reporting module 252, and cache 259. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Each of power source 241, processors 243, communication units 245, input devices 246, output devices 247, and storage device 250 may be implemented in a manner that corresponds to the descriptions of similar components of computing system 270 of FIG. 4. In some examples, each such component or device may be implemented in a manner different than those described in connection with computing system 270.

Gating module 251 may perform functions relating to enabling or disabling access to public network 110 by devices on network 105. Gating module 251 may perform some of the primary functions of computing system 240, determining whether a network flow destined for public network 110 should be permitted. Gating module 251 may evaluate a destination address associated with a network flow, and determine whether that address has been scrutinized by test module 190 of director engine 170. To make such a determination, gating module 251 may access a local cache of information about addresses evaluated by director engine 170, may communicate with data store 189 over public network 110 to determine whether one or more addresses are included on a whitelist of permitted addresses maintained at data store 189.

Cache 259 may represent any suitable data structure or storage medium for storing address information that enables gating module 251 to operate effectively and efficiently. While cache 259 could serve as a primary store for information relating to legitimacy, location, and/or latency of such addresses, cache 259 may serve as a cache for such information, enabling gating module 251 local access to at least some of the information otherwise stored at data store 189. The information stored in data store 259 may be searchable and/or categorized such that one or more modules within computing system 270 may provide an input requesting information from data store 259, and in response to the input, receive information stored within data store 259. Data store 259 may be primarily maintained by either DNS module 281 or test module 290.

Reporting module 252 may perform functions relating to reporting on gating or filtering operations performed by gating module 251. In some examples, reporting module 252 may monitor addresses evaluated by gating module 251 and log information about whether a network flow, based on a destination address associated with the network flow, was denied access to public network 110. Reporting module 252 may report such information by communicating with one or more devices over public network 110, or in other examples, reporting module 252 may expose an API enabling the logged information to be searchable and/or categorized such that other devices may provide an input to cache 259 requesting reporting information, and in response to the input, cache 259 may respond with responsive information.

Computing system 270 may perform a DNS lookup. Client device 103A detects input that it determines corresponds to a request for information about a network destination, such as one of websites 111. Client device 103A outputs information about the request, which may include URL 104, over network 105. Security gate 140 detects the request, determines that computing system 270 acts as a legitimate DNS server, and enables access to computing system 270 over public network 110. Communication unit 275 of computing system 270 detects a signal over public network 110 and outputs information about the signal to DNS module 281. DNS module 281 determines that the signal corresponds to a request to resolve an address from URL 104. DNS module 281 performs a DNS lookup to translate URL 104 into one or more addresses 106 (e.g., IP addresses).

Computing system 270 may evaluate addresses 106 identified as a result of the DNS lookup. DNS module 281 outputs information about addresses 106 to test module 290. Test module 290 may interact with each of legitimacy module 291, location module 292, and latency module 293 to enable each such module to perform tests on each of addresses 106, as described below. However, in some examples, test module 290 first queries data store 289 for information about addresses 106. Data store 289 may serve as a store and/or cache for evaluations for various addresses, such as addresses that have been previously evaluated by one or more of legitimacy module 291, location module 292, and latency module 293. If data store 289 includes sufficient information about addresses 106, it might not be necessary for each of legitimacy module 291, location module 292, and latency module 293 to evaluate addresses 106. If data store 289 does not include sufficient information about addresses 106, test module 290 causes each of legitimacy module 291, location module 292, and latency module 293 evaluate and/or perform tests on each of addresses 106.

Legitimacy module 291 may evaluate each of addresses 106 for legitimacy. Legitimacy module 291 evaluates addresses 106 for legitimacy, which may include checking route registries of subnets associated with one or more of addresses 106. Legitimacy module 291 may determine whether a route object associated with one or more of addresses 106 exists. Legitimacy module 291 may determine whether the host associated with each of addresses 106 is behind a legitimate content delivery network.

Location module 292 may evaluate each of addresses 106 for latency. For instance, location module 292 may check the latency associated with each of addresses 106 against a threshold. In some examples, if any of addresses 106 have a latency exceeding 50 milliseconds, that address 106 is considered to fail a test associated with latency.

Latency module 293 may evaluate each of addresses 106 for location. For instance, latency module 293 may determine whether each of addresses 106 corresponds to regional traffic, and if so, may determine whether any of addresses 106 trespass outside of the region.

Computing system 270 may assess evaluations performed by legitimacy module 291, location module 292, and latency module 293. Test module 290 identifies any of addresses 106 that did not pass one or more of the evaluations performed by legitimacy module 291, location module 292, and latency module 293. Test module 290 may discard each of addresses 106 that failed to pass one or more tests performed by legitimacy module 291, location module 292, and latency module 293. Where the remaining addresses 106 include more than one address, test module 290 designates one of addresses 106 as the best or preferred address. Test module 290 may make such a designation based on the results of the tests performed by legitimacy module 291, location module 292, and latency module 293. In some examples, each of legitimacy module 291, location module 292, and latency module 293 may generate a score that enables test module 290 to compare each of addresses 106. Test module 290 may designate one of addresses 106 based on which of addresses 106 has the highest (or most favorable) score. In some examples, test module 290 may alternatively, or in addition, sort the remaining addresses 106. Such a sort may be performed based on scores generated by each of legitimacy module 291, location module 292, and latency module 293.

Computing system 270 may store one or more of addresses 106. If test module 290 determines that some or all of addresses 106 pass the tests performed by legitimacy module 291, location module 292, and latency module 293, test module 290 causes communication unit 275 to output a signal over public network 110. Data store 189 detects a signal over public network 110 and determines that the signal corresponds to one or more addresses 106 (e.g., those addresses 106 that passed the tests performed by legitimacy module 291, location module 292, and latency module 293). Data store 189 stores addresses 106 received from computing system 270. Data store 189 maintains a store of addresses that have passed tests performed by legitimacy module 291, location module 292, latency module 293.

Computing system 270 may respond to the request from client device 103A by sending one or more of addresses 106. Test module 290 outputs information about the evaluations of addresses 106 to DNS module 281. DNS module 281 of computing system 270 causes communication unit 275 to output a signal over public network 110, where the signal includes information about at least one of the addresses 106 that passed tests performed by legitimacy module 291, location module 292, and latency module 293. Communication unit 245 of computing system 240 detects the signal and determines that the signal is intended for client device 103A. Communication unit 245 of computing system 240 outputs a signal over network 105.

Client device 103A may receive the response from computing system 270. Client device 103A detects a signal over network 105, and determines that the signal corresponds to a response to the earlier request, by client device 103A, for information about a network destination. Client device 103A further determines that the signal includes one or more addresses 106, and that each of addresses 106 represents a response to the request for information about URL 104. Where more than one address 106 is included within the response from computing system 270, client device 103A may further determine that addresses 106 includes a "best"

or "preferred" one of addresses 106 (e.g., address 106' associated with website 111A).

Client device 103A may initiate access to a network destination on public network 110. Client device 103A outputs a signal over network 105 (see network traffic labeled "4"). Communication unit 245 of computing system 240 detects a signal and outputs information about the signal to gating module 251. Gating module 251 determines that the signal corresponds to a request to access a device at address 106'.

Computing system 240 may determine whether to allow access to the network device at address 106'. (A "network device" as used herein may encompass a web server, data store, or any other network-enabled device or system.) Gating module 251 causes communication unit 245 to output a signal over public network 110. Data store 189 detects a signal over public network 110 and determines that the signal includes an inquiry about whether address 106' is included within the store of addresses, maintained by data store 189, that have passed tests performed by legitimacy module 291, location module 292, and latency module 293. Data store 189 determines a response to the inquiry and outputs the response over public network 110. Communication unit 245 of computing system 240 detects a signal and outputs information about the signal to gating module 251. Gating module 251 determines, based on the signal, whether address 106' is included within the store of addresses that have passed tests performed by legitimacy module 291, location module 292, and latency module 293. If gating module 251 determines that address 106' has passed the tests, gating module 251 causes communication unit 245 to enables the request, by client device 103A, to access website 111A.

In a different example, computing system 240 may reject access to the requested network destination. For example, if gating module 251 of computing system 240 determines, based on the signal received from data store 189, that address 106' is not included within the store of address that have passed tests performed by legitimacy module 291, location module 292, and latency module 293, gating module 251 causes communication unit 245 to reject the request. If address 106' is not included within the store or whitelist of address at data store 189 that have passed tests performed by legitimacy module 291, location module 292, and latency module 293, that could mean that address 106' failed one or more of such tests. In some examples, if address 106' is not included within the store or whitelist of address at data store 189, that also could mean that address 106' has not been evaluated. In the example being described, gating module 251 of computing system 240 causes communication unit 245 to reject the traffic seeking access to address 106' in either situation. Gating module 251 may reject the request by client device 103A by causing communication unit 245 to drop packets or abandon one or more network flows associated with the request by client device 103A to access the network destination on public network 110. In such an example, the request by client device 103A will never reach website 111A, website 111A will never respond to client device 103A, thus effectively denying client device 103A access to website 111A.

In some examples, as described above, computing system 240 determines whether address 106' has passed tests performed by computing system 270 by accessing information in data store 189. Computing system 240 may alternatively, or in addition, maintain cache 259 to store information about previously evaluated addresses. In examples where computing system 240 includes cache 259, gating module 251 of computing system 240 may evaluate whether to allow access to a an address (e.g., address 106') by first determining whether cache 259 includes information indicating that an assessment of the address has already been performed (e.g., whether it has passed the tests described as being performed by computing system 270). If cache 259 includes information about the address, access to data store 189 over public network 110 may be avoided, and a determination of whether to allow access to the network device can be made using information stored in cache 259. In some examples, cache 259 may include a list of addresses that have been evaluated by the tests performed by legitimacy module 291, location module 292, and latency module 293, along with an indication of whether such addresses have passed those tests.

In some examples, information about addresses stored within data store 189 may be useful or valid for only a limited time, at least because the underlying network may change and evolve. Accordingly, when test module 290 accesses data store 189 to determine whether information about an address is available based on a prior evaluation of that address, test module 290 may instruct data store 189 to discard such information if it is not sufficiently new. In such an example, test module 290 may perform a new evaluation on the address by interacting with each of legitimacy module 291, location module 292, and latency module 293. Test module 290 may periodically purge or cause data store 189 to purge evaluation information stored in data store 189 after it has been stored for a sufficient amount of time (e.g., 24 hours, or on the order of days). In some examples, rather than purging stale information about previously-evaluated addresses, test module 290 may independently update the information stored within data store 189 about previously-evaluated addresses. Test module 290 may perform such an update periodically, intermittently, or pursuant to a schedule. Further, test module 290 may also occasionally or periodically purge information about addresses stored in 289 in a similar fashion. Computing system 240 may also occasionally or periodically purge information about addresses stored in cache 259.

Data store 189 is illustrated in FIG. 2 and in other illustrations herein as being separate from computing system 240 and computing system 270. However, in other examples, data store 189 may be incorporated within computing system 270 and may be maintained by computing system 270. In such an example, computing system 270 may communicate information about data store 189 to computing system 240 so that computing system 240 can assess whether destination addresses associated network traffic passing through computing system 240 are included within the store of addresses that have passed the tests performed by computing system 270. In such an example, computing system 240 may cache information about the communications within cache 259. In still other examples, data store 189 may be incorporated within computing system 240, and computing system 270 may, after performing the tests conducted by modules 291, 292, and 293, update data store 189 within computing system 240.

Computing system 240 and computing system 270 are also illustrated in FIG. 2 and in other illustrations herein as being implemented separately. However, in other examples, some or all aspects and/or functionality of computing system 240 and computing system 270 may be combined. In such an example, data store 189 may also be included within the combined computing system, or may be implemented separately.

Modules illustrated herein (e.g., DNS module 181, test module 190, DNS module 281, test module 290, legitimacy module 291, location module 292, latency module 293, gating module 251, reporting module 252) may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 5:
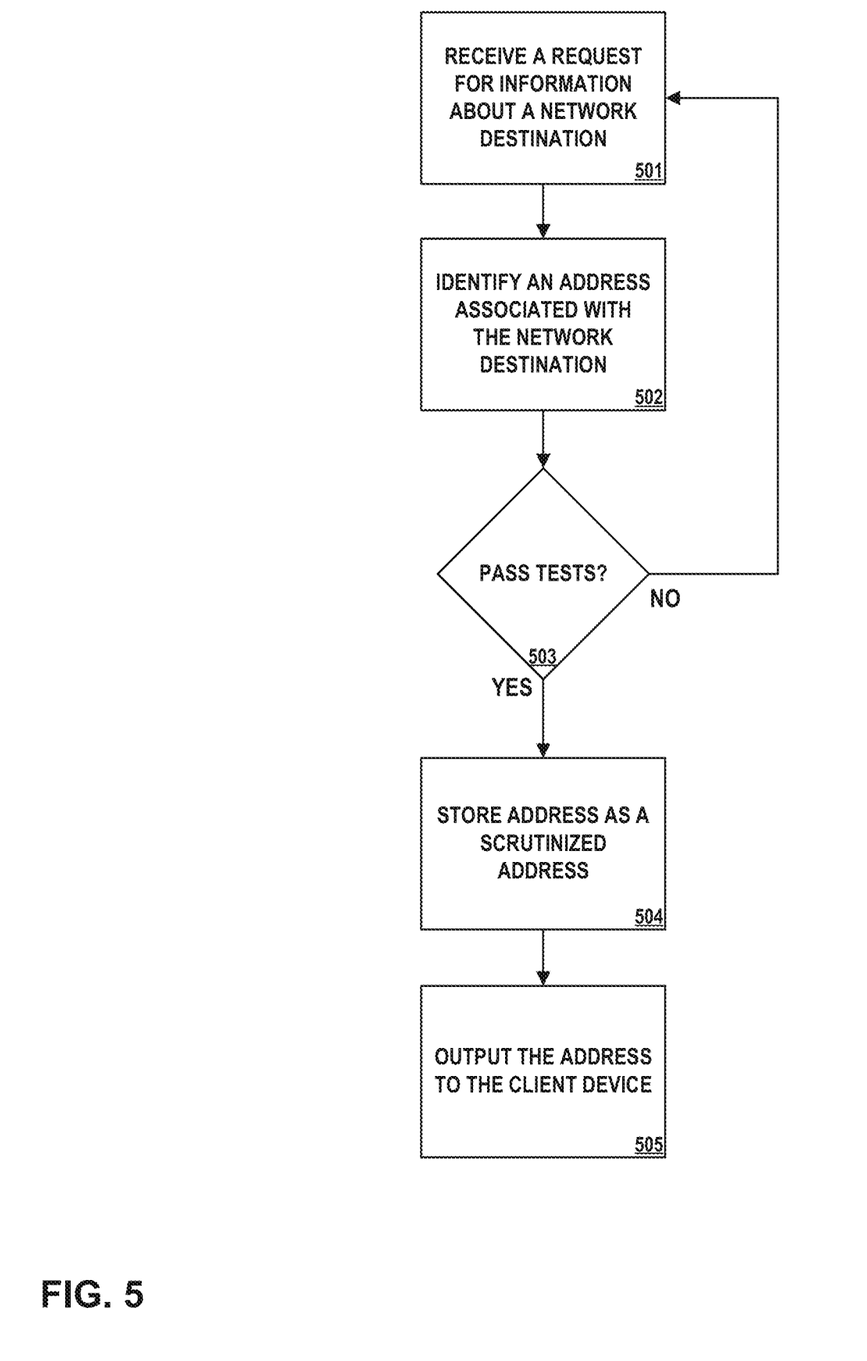
FIG. 5 is a flow diagram illustrating operations performed by an example computing system in accordance with one or more aspects of the present disclosure.

FIG. 5 is a flow diagram illustrating operations performed by an example computing system in accordance with one or more aspects of the present disclosure. FIG. 5 is described below within the context of computing system 270 of FIG. 4. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 270 may receive a request for information about a network destination (501). For example, with reference to FIG. 4, client device 103A detects input that it determines corresponds to a request to browse to URL 104. Client device 103A outputs URL 104 over network 105 and over public network 110. Communication unit 245 of computing system 270 detects a signal over network 110 and outputs information about the signal to DNS module 281. DNS module 281 determines that the signal corresponds to a request to perform a DNS lookup for URL 104.

Computing system 270 may identify an address associated with the network destination (502). For example, DNS module 281 performs a DNS lookup, which, in some examples, may involve accessing data store 289. In other examples, performing a DNS lookup involves accessing another system on public network 110. DNS module 281 identifies one or more addresses 106 that correspond to URL 104.

Computing system 270 may determine whether the address passes a plurality of tests (503). For example, DNS module 281 outputs information about addresses 106 to test module 290. Test module 290 performs a number of tests on each of addresses 106 to evaluate each address 106. In some examples, test module 290 performs the tests by outputting each of addresses 106 to legitimacy module 291, location module 292, and latency module 293. Legitimacy module 291 performs test relating to whether each of addresses 106 is legitimate. Location module 292 performs tests relating to whether each of addresses 106 has' is sufficiently responsive (i.e., no significant latency issues). Latency module 293 performs test relating to whether each of addresses 106 is associated with a network device in an appropriate location. Test module 290 may determine that none of addresses 106 pass all of the tests. In such an example, computing system 270 might choose to not respond to the request by client device 103A to perform a DNS lookup for URL 104 (NO path from 503). In another example, computing system 270 may identify one or more addresses 106 that pass all of the tests performed or orchestrated by test module 290 (YES path from 503).

Computing system 270 may store the address as a scrutinized address (504). For example, test module 290 causes communication unit 275 to output a signal over network 105. Data store 189 detects a signal and determines that the signal corresponds to one or more addresses 106. Data store 189 stores each of addresses 106 identified by the signal as a scrutinized address.

Computing system 270 may output the address to the client device (504). For example, test module 290 outputs information about addresses 106 to DNS module 281. DNS module 281 causes communication unit 275 to output a signal over network 110 and then over network 105. Client device 103A detects a signal and determines that the signal corresponds to a response to its request to perform a DNS lookup for URL 104. Client device 103A further determines that the signal identifies one or more addresses 106. Where more than one address 106 is identified, client device 103A may determine that the signal identifies a preferred address 106'.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by a computing system and from a client device connected to a private network controlled by an organization, a request for information about a network destination on a public network not controlled by the organization;
identifying, by the computing system and based on the request, an address associated with the network destination;
evaluating, by the computing system, the address to determine whether the address passes a plurality of tests pertaining to each of legitimacy, latency, and location, wherein evaluating legitimacy includes evaluating whether the address is invalid, and wherein evaluating latency includes enabling access to the address if historical response times for the address are below a threshold;
responsive to determining that the address passes the plurality of tests, storing the address, by the computing system, as one of a plurality of scrutinized addresses;
outputting, by the computing system and to the client device, the address;
receiving, by a security gate on the private network controlled by the organization and from the computing system, the address;
storing, by the security gate, the address in a list of scrutinized addresses maintained in a local cache;
receiving, by the security gate and from the client device, an indication of traffic flowing to a network device at a destination address on the public network;
determining, by the security gate, whether the destination address is included within the list of scrutinized addresses maintained in the local cache; and
responsive to determining that the destination address is included within the list of scrutinized addresses, enabling access, by the security gate, by the client device to the network device at the destination address.

2. The method of claim 1, wherein the network device is a first network device and the destination address is a first destination address, and wherein the client device is a first client device, the method further comprising:
receiving, by the computing system and from a second client device, an indication of traffic flowing to a second network device at a second destination address on the public network;
determining, by the computing system, whether the second destination address is included within the plurality of scrutinized addresses; and
responsive to determining that the second destination address is included within the plurality of scrutinized addresses, enabling access to the second network device at the second destination address.

3. The method of claim 2, further comprising:
receiving, by the computing system and from a third client device, an indication of traffic flowing to a third network device at a third destination address on the public network;
determining, by the computing system, whether the third destination address is included within the plurality of scrutinized addresses; and
responsive to determining that the third destination address is not included within the plurality of scrutinized addresses, denying access to the third network device at the third destination address.

4. The method of claim 3, wherein determining whether the third destination address is included within the plurality of scrutinized addresses includes:
determining that the third destination address has not been evaluated to determine whether the third destination address passes the plurality of tests.

5. The method of claim 3, wherein determining whether the third destination address is included within the plurality of scrutinized addresses includes:
determining that the third destination address has been evaluated to determine whether the third destination address passes the plurality of tests, and that the third destination address did not pass one or more of the plurality of tests.

6. The method of claim 1,
wherein the request for information about the network destination is a domain name system (DNS) request; and
wherein identifying the address associated with the network destination includes a DNS lookup.

7. The method of claim 1, wherein outputting the address includes:
outputting a plurality of addresses including the address, and identifying the address as a preferred address.

8. A computing system having a storage system and processing circuitry, wherein the processing circuitry has access to the storage system and is configured to:
receiving, from a client device connected to a private network controlled by an organization, a request for information about a network destination on a public network not controlled by the organization;
identifying, based on the request, an address associated with the network destination;
evaluating the address to determine whether the address passes a plurality of tests pertaining to each of legitimacy, latency, and location, wherein evaluating legitimacy includes evaluating whether the address is invalid, and wherein evaluating latency includes enabling access to the address if historical response times for the address are below a threshold;
responsive to determining that the address passes the plurality of tests, storing the address as one of a plurality of scrutinized addresses;
outputting, to the client device, the address; and
enabling a security gate on the private network controlled by the organization to:
receive, from the computing system, the address,
store the address in a list of scrutinized addresses maintained in a local cache, receive, from the client device, an indication of traffic flowing to a network device at a destination address on the public network, determine whether the destination address is included within the list of scrutinized addresses maintained in the local cache, and responsive to determining that the destination address is included within the list of scrutinized addresses, enable access by the client device to the network device at the destination address.

9. The computing system of claim 8, wherein the network device is a first network device and the destination address is a first destination address, wherein the client device is a first client device, and wherein the processing circuitry is further configured to perform operations comprising:

receiving, by the computing system and from a second client device, an indication of traffic flowing to a second network device at a second destination address on the public network;

determining, by the computing system, whether the second destination address is included within the plurality of scrutinized addresses; and responsive to determining that the second destination address is included within the plurality of scrutinized addresses, enabling access to the second network device at the second destination address.

10. The computing system of claim 9, wherein the processing circuitry is further configured to perform operations comprising:

receiving, by the computing system and from a third client device, an indication of traffic flowing to a third network device at a third destination address on the public network;

determining, by the computing system, whether the third destination address is included within the plurality of scrutinized addresses; and responsive to determining that the third destination address is not included within the plurality of scrutinized addresses, denying access to the third network device at the third second destination address.

11. The computing system of claim 10, wherein determining whether the third destination address is included within the plurality of scrutinized addresses includes:

determining that the third destination address has not been evaluated to determine whether the third destination address passes the plurality of tests.

12. The computing system of claim 10, wherein determining whether the third destination address is included within the plurality of scrutinized addresses includes:

determining that the third destination address has been evaluated to determine whether the third destination address passes the plurality of tests, and that the third destination address did not pass one or more of the plurality of tests.

13. The computing system of claim 8, wherein the request for information about the network destination is a domain name system (DNS) request; and wherein identifying the address associated with the network destination includes a DNS lookup.

14. The computing system of claim 8, wherein outputting the address includes:

outputting a plurality of addresses including the address, and identifying the address as a preferred address.

15. A system comprising:

a private network;

a director engine coupled to the private network and configured to perform operations comprising:

receiving, from a client device connected to the private network controlled by an organization, a request for information about a network destination on a public network not controlled by the organization;

identifying, based on the request, an address associated with the network destination;

evaluating the address to determine whether the address passes a plurality of tests pertaining to each of legitimacy, latency, and location, wherein evaluating legitimacy includes evaluating whether the address is invalid, and wherein evaluating latency includes enabling access to the address if historical response times for the address are below a threshold;

responsive to determining that the address passes the plurality of tests, storing the address as one of a plurality of scrutinized addresses; and outputting, to the client device, the address; and a security gateway coupled to the private network and configured to perform operations comprising:

receiving, from the system, the address;

storing the address in a list of scrutinized addresses maintained in a local cache;

receiving, from the client device, an indication of traffic flowing to a network device at a destination address on the public network;

determining whether the destination address is included within the list of scrutinized addresses maintained in the local cache; and responsive to determining that the destination address is included within the list of scrutinized addresses maintained in the local cache, enabling access by the client device to the network device at the destination address.

* * * * *